United States Patent
Chen

(10) Patent No.: US 12,136,748 B2
(45) Date of Patent: Nov. 5, 2024

(54) ENERGY STORAGE DEVICE AND ELECTRICAL EQUIPMENT

(71) Applicants: Shenzhen Hithium Energy Storage Technology Co., Ltd., Shenzhen (CN); XIAMEN HITHIUM ENERGY STORAGE TECHNOLOGY CO., LTD., Fujian (CN)

(72) Inventor: Jinqiang Chen, Fujian (CN)

(73) Assignees: SHENZHEN HITHIUM ENERGY STORAGE TECHNOLOGY CO., LTD., Shenzhen (CN); XIAMEN HITHIUM ENERGY STORAGE TECHNOLOGY CO., LTD., Fujian (CN)

(*) Notice: Subject to any disclaimer, the term of this patent is extended or adjusted under 35 U.S.C. 154(b) by 0 days.

(21) Appl. No.: 18/380,947

(22) Filed: Oct. 17, 2023

(65) Prior Publication Data

US 2024/0274994 A1    Aug. 15, 2024

(30) Foreign Application Priority Data

Feb. 9, 2023 (CN) .......................... 202310090143.5

(51) Int. Cl.
*H01M 50/536* (2021.01)
*H01M 50/533* (2021.01)

(52) U.S. Cl.
CPC ....... *H01M 50/536* (2021.01); *H01M 50/533* (2021.01)

(58) Field of Classification Search
CPC .......................... H01M 50/536; H01M 50/533
(Continued)

(56) References Cited

U.S. PATENT DOCUMENTS

| 11,682,813 | B1* | 6/2023 | Lu | .................... | H01M 10/0587 |
| | | | | | 429/163 |
| 2005/0048365 | A1* | 3/2005 | Miyahisa | ............ | H01M 50/566 |
| | | | | | 29/623.2 |

(Continued)

FOREIGN PATENT DOCUMENTS

| CN | 107104207 A | 8/2017 |
| CN | 209029470 U | 6/2019 |

(Continued)

OTHER PUBLICATIONS

Battery connecting piece and tab welding structure by Li Yongjun et al. in (CN209029470-2019-06-25); English language machine translation—(Year: 2019).*

(Continued)

*Primary Examiner* — Jonathan G Jelsma
*Assistant Examiner* — Omar M Kekia
(74) *Attorney, Agent, or Firm* — Scully, Scott, Murphy & Presser, P.C.

(57) ABSTRACT

The present disclosure relates to an energy storage device and an electrical equipment. The energy storage device includes a housing, a jellyroll, a connecting sheet, and a top cover. The jellyroll is provided with a tab, and the connecting sheet includes a side wing part. The energy storage device includes a welding structure composed of the tab and the side wing part. A tab sheet farthest from the side wing part in the tab sheets included by the tab is a first tab sheet, the welding structure forms a welding area on the first tab sheet. An area of the welding area is S1, an area of the side wing part is S2, and a projection area of the first tab sheet on a plane where the side wing part is located is S3, wherein $0.4 \leq S1/S2 \leq 0.8$, $0.14 \leq S1/S3 \leq 0.28$.

14 Claims, 3 Drawing Sheets

(58) Field of Classification Search
USPC .......................................................... 429/122
See application file for complete search history.

(56) References Cited

U.S. PATENT DOCUMENTS

2019/0329353 A1* 10/2019 Dai .................... B23K 26/0876
2021/0399269 A1* 12/2021 Peng .................... H01M 50/54

FOREIGN PATENT DOCUMENTS

| | | |
|---|---|---|
| CN | 209786103 U | 12/2019 |
| CN | 210908609 U | 7/2020 |
| CN | 213483915 U | 6/2021 |
| CN | 113097656 A | 7/2021 |
| CN | 214518389 U | 10/2021 |
| CN | 114094289 A | 2/2022 |
| CN | 216413218 U | 4/2022 |
| CN | 114696045 A | 7/2022 |
| CN | 217848246 U | 11/2022 |
| CN | 115603004 A | 1/2023 |
| DE | 102019005152 A1 | 1/2021 |
| JP | 2017084653 A | 5/2017 |
| JP | 2019175688 A | 10/2019 |
| WO | 2018199439 A1 | 11/2018 |

OTHER PUBLICATIONS

Chinese Office Action dated Mar. 25, 2023 issued in CN 202310090143.5.
Notification of Grant Patent Right and Notice of Allowance dated Apr. 17, 2023 issued in CN 202310090143.5.
International Search Report dated Sep. 4, 2023 issued in PCT/CN2023/075220.

* cited by examiner

ENERGY STORAGE DEVICE AND ELECTRICAL EQUIPMENT

CROSS-REFERENCE TO RELATED APPLICATIONS

This application claims priority to Chinese Application No. 202310090143.5, filed on Feb. 9, 2023, which is incorporated herein by reference in its entirety.

TECHNICAL FIELD

The present disclosure relates to the field of battery technology, specifically to an energy storage device and an electrical equipment.

BACKGROUND

In the related arts, a battery typically includes a housing and an electrode assembly provided within the housing. The electrode assembly includes a jellyroll, a connecting sheet and a tab connected to an end of the jellyroll. The tab and the connecting sheet are usually fixed by ultrasonic welding. Generally, all overlapping areas between the tab and the connecting sheet are welded during welding, so that debris is adhered to edges of the overlapping areas. During the battery charging and discharging process, debris tends to fall off, which may cause a short circuit between positive and negative electrodes, and lead to a serious safety hazard.

SUMMARY

An object of the present disclosure is to provide an energy storage device and an electrical equipment with improved safety performance.

In order to achieve the above object, the present disclosure provides the following technical solutions.

According to an aspect of the present disclosure, an energy storage device is provided. The energy storage device includes a housing, a jellyroll, a connecting sheet, and a top cover. The jellyroll and the connecting sheet are received within the housing, and the top cover seals the housing.

The jellyroll is provided with a tab, and the connecting sheet includes a body part and a side wing part.

The energy storage device further includes a welding structure. The welding structure is composed of the tab and the side wing part, and the welding structure is formed by welding.

The tab includes a plurality of tab sheets, in which a tab sheet farthest from the side wing part is a first tab sheet. The welding structure forms a welding area on the first tab sheet.

An area of the welding area is $S1$, an area of the side wing part is $S2$, and a projection area of the first tab sheet on a plane where the side wing part is located is $S3$, wherein:

$$0.4 \leq S1/S2 \leq 0.8; 0.14 \leq S1/S3 \leq 0.28.$$

In the embodiment of the present disclosure, after the side wing part of the connecting sheet is attached to the tab, selecting an appropriate area proportion of the welding area can greatly reduce the generation of debris while ensuring the welding strength, thereby reducing the safety hazards of the energy storage device. In addition, using a welding structure composed of the connecting sheet and the tab can avoid from using a protective sheet and thus reduce the cost, remove a procedure of placing the protective sheet, prevent the protective sheet from scratching the tab which may cause the product to be scrapped when the protective sheet is being placed, and greatly improve the welding efficiency.

According to an embodiment of the present disclosure, the welding area includes a fixing welding area and a guiding welding area, wherein the fixing welding area and the guiding welding area are distributed along a length direction of the side wing part.

A distance between the fixing welding area and the guiding welding area is $d1$, and a size of the fixing welding area in the length direction of the side wing part is $d2$, wherein $d1/d2 \leq 1.5$.

In the embodiment of the present disclosure, the fixing welding area and the guiding welding area are provided with a gap between the fixing welding area and the guiding welding area defined, so that the tab and the side wing part may be welded by separate regions (i.e., there are separate welding regions between the tab and the side wing part). The deformation of the tab in the fixing welding area and the guiding welding area can be alleviated by the gap, so as to reduce the deformation amount per unit length during welding of the tab in the length direction of the side wing part and reduce the risk of tearing of the tab.

According to an embodiment of the present disclosure, the side wing part is welded with the tab to form several first welding spots located in the fixing welding area, and several second welding spots located in the guiding welding area.

A gap between the fixing welding area and the guiding welding area is less than a size of the first or second welding spot in the length direction of the side wing part.

In the embodiment of the present disclosure, the distance between the fixing welding area and the guiding welding area is shortened to increase the welding area of the tab and the connecting sheet, thereby further ensuring the welding strength and ensuring the flow guiding effect between the tab and the connecting sheet.

According to an embodiment of the present disclosure, a welding mark area of the first welding spots is smaller than or equal to a welding mark area of the second welding spots.

In the embodiment of the present disclosure, when welding in the fixing welding area, the size of the first welding spot is reduced, thereby reducing the deformation amount of the tab during welding, and reducing the risk of tab tearing during welding. Meanwhile, when welding in the guiding welding area, the size of the second welding spot is increased, thereby ensuring a sufficient contact area between the tab and the side wing part in the guiding welding area, and ensuring the flow guiding effect between the tab and the connecting sheet.

According to an embodiment of the present disclosure, there is an overlapping area between the side wing part and the first tab sheet in a thickness direction of the side wing part.

An area of the fixing welding area is $S11$, an area of the overlapping area is $S4$, and a distance between an edge of the fixing welding area and an edge of the overlapping area is $L1$, wherein $5\% \leq S11/S4 \leq 25\%$; and $1 \text{ mm} \leq L1 \leq 3 \text{ mm}$.

In the embodiment of the present disclosure, the area of the fixing welding area and edges of the fixing welding area and the side wing part are defined, so as to increase a fixing area of the tab and the connecting sheet in the length direction and a width direction of the side wing part, thereby ensuring the welding stability of the tab and the connecting sheet while effectively reducing the risk of tab tearing.

According to an embodiment of the present disclosure, there is an overlapping area between the side wing part and the first tab sheet in the thickness direction of the side wing part.

An area of the guiding welding area is S12, and an area of the overlapping area is S4, and a distance between an edge of the guiding welding area and an edge of the overlapping area is L2, wherein 10%≤S12/S4≤90%; and 1 mm≤L2≤3 mm.

In the embodiment of the present disclosure, the area of the guiding welding area and edges of the guiding welding area and the side wing part are defined, so as to increase the flow guiding area of the tab and the connecting sheet in the width direction of the side wing, thereby effectively reducing the risk of tab tearing while ensuring a sufficient contact area between the tab and the connecting sheet, and thus ensuring the flow guiding effect between the tab and the connecting sheet.

According to an embodiment of the present disclosure, the plurality of tab sheets are welded with the side wing part to form several first welding spots, and the first welding spots are located in the fixing welding area.

A distance between two adjacent first welding spots is L11, and a size of the first welding spot in a layout direction of the two adjacent first welding spots is L12, wherein L11<L12.

In the embodiment of the present disclosure, a density of the first welding spots in the fixing welding area is adjusted so as to ensure the stability of welding when the tab and the connecting sheet are fixedly welded.

According to an embodiment of the present disclosure, L11/L12>10%.

In the embodiment of the present disclosure, a minimum distance between the two adjacent first welding spots in the fixing welding area is defined to reduce the risk of tab tearing between the adjacent first welding spots.

According to an embodiment of the present disclosure, the plurality of tab sheets are welded with the side wing part to form several second welding spots, and the second welding spots are located in the guiding welding area.

A distance between two adjacent second welding spots is L21, and a size of the second welding spot in a layout direction of the two adjacent second welding spots is L22, wherein L21<L22.

In the embodiment of the present disclosure, a density of the second welding spots in the guiding welding area is adjusted so as to ensure the flowing effect between the tab and the connecting sheet.

According to an embodiment of the present disclosure, L21/L22>10%.

In the embodiment of the present disclosure, a minimum distance between the two adjacent second welding spots in the guiding welding area is defined to reduce the risk of tab tearing between the adjacent second welding spots.

According to an embodiment of the present disclosure, a plurality of welding areas include two fixing welding areas located on both sides of the guiding welding area along the length direction of the side wing part.

In the embodiment of the present disclosure, two fixing welding areas are fixedly welded at both ends thereof in the length direction of the side wing part, thereby further ensuring the stability of the relative position between the tab and the connecting sheet before the flow guiding welding. In addition, the welding area is divided into three partition areas, further increasing a distribution range of the three partition areas, increasing the overall fixing area between the tab and the connecting sheet, improving the stability of connection between the tab and the connecting sheet, and increasing the overall flow guiding area of the tab and the connecting sheet.

According to an embodiment of the present disclosure, two fixing welding areas are symmetrically distributed with respect to the guiding welding area.

In the embodiment of the present disclosure, the guiding welding area is positioned and centered between the two fixing welding areas, ensuring the uniformity of flowing between the tab and the connecting sheet, and thereby ensuring the flow guiding effect of the tab and the connecting sheet.

According to an embodiment of the present disclosure, a thickness of the welding structure is H, wherein 1.8 mm≤H≤2.2 mm.

In the embodiment of the present disclosure, the thickness of the welding structure is defined, avoiding the risk that it is easy to be tore due to a thin welding structure, and thereby ensuring the flow guiding effect between the tab and the connecting sheet; and also avoiding a situation where a thick welding structure occupies a large space inside the housing so that the overall volume of the energy storage device is large.

According to an embodiment of the present disclosure, the welding area includes a plurality of welding spots, and a depth of the welding spot is S, wherein 1 mm≤S≤1.5 mm.

In the embodiment of the present disclosure, the depth of the welding spot in the welding area is defined to reduce a deformation area of the tab, that is, reduce the deformation amount of the tab, and reduce the risk of tab tearing; and also reduce the risk of unstable welding on the tab and the connecting sheet since the depth of the welding spot is small.

According to an aspect of the present disclosure, an electrical equipment is provided. The electrical equipment includes an energy storage device as described in the above aspect, and the energy storage device supplies power to the electrical equipment.

In the embodiment of the present disclosure, in combination with the energy storage device as mentioned above, when it is not necessary to provide the protective sheet (i.e., the arrangement of the protective sheet can be omitted), it is beneficial to reduce the weight of the energy storage device, thereby reducing the load on the electrical equipment and improving its performance.

It should be understood that the general description as mentioned above and the detailed description in the following contents are only illustrative and explanatory, and do not limit the present disclosure.

BRIEF DESCRIPTION OF THE DRAWINGS

With reference to the accompanying drawings, the exemplary embodiments are described in detail, and the above and other features and advantages of the present disclosure will become more apparent.

The reference numbers are listed as follows:
100 cell;
10 housing; 20 jellyroll; 30 connecting sheet; 40 top cover; 50 welding area;
21 tab; 22 first tab sheet;
31 body part; 32 side wing part;
51 fixing welding area; 52 first welding spot; 53 guiding welding area; 54 second welding spot.

DETAILED DESCRIPTION

The exemplary embodiments will now be described more comprehensively with reference to the accompanying drawings. However, the exemplary embodiments can be implemented in multiple forms and should not be limited to the embodiments described herein; on the contrary, providing these embodiments makes the present disclosure comprehensive and complete, and fully conveys the concept of the exemplary embodiments to those skilled in the art. The same reference numbers in the figures represent the same or similar structures, and thus their detailed descriptions will be omitted.

An embodiment of the present disclosure provides an energy storage device, which may be, but is not limited to, a cell, a battery module, a battery pack, a battery system, etc. When the energy storage device is a cell, it may be a prismatic cell or a cylindrical cell. Next, a prismatic cell is taken as an example of the energy storage device to provide a detailed description of the energy storage device.

Figure 1:
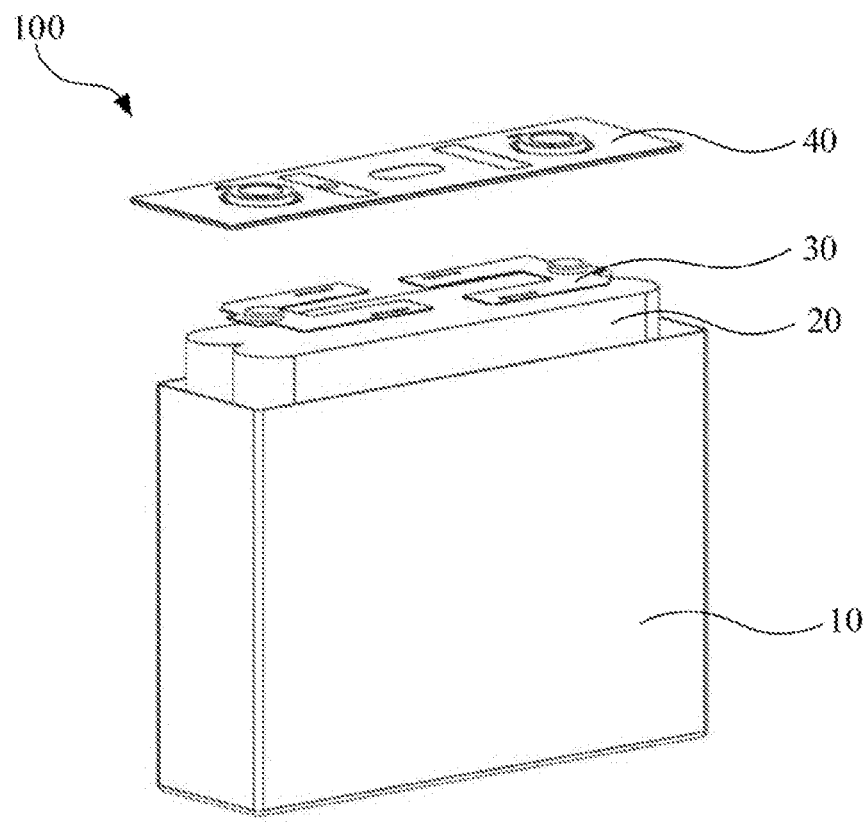
FIG. 1 is an exploded structural schematic view of a cell according to an exemplary embodiment.
Figure 2:
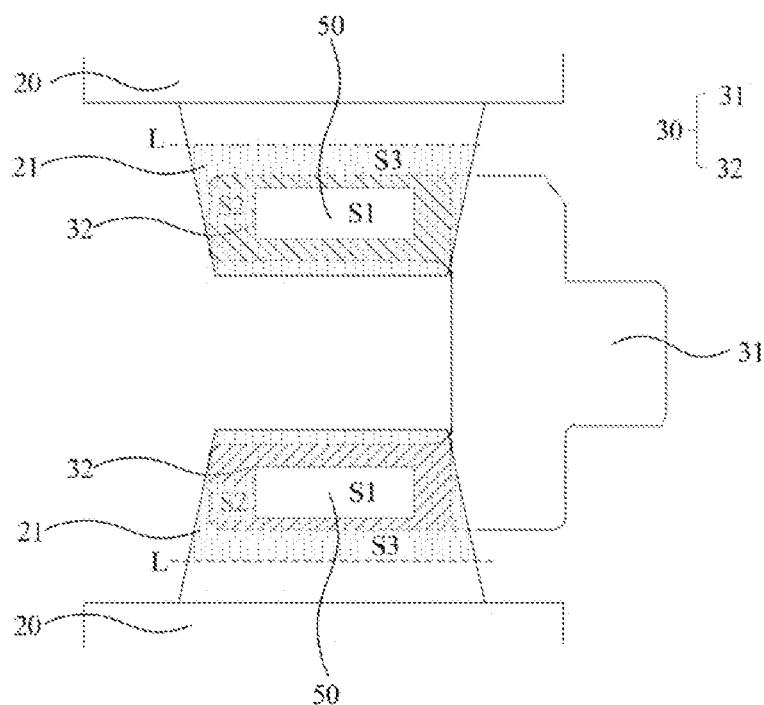
FIG. 2 is a structural schematic view of a connecting sheet according to an exemplary embodiment.

FIG. 1 illustrates an exploded structural schematic view of a cell 100 provided in the embodiment of the present disclosure, and FIG. 2 illustrates a structural schematic view of a tab 21 connected to a connecting sheet 30 provided in the embodiment of the present disclosure. As shown in FIGS. 1 and 2, the cell 100 includes a housing 10, a jellyroll 20, a connecting sheet 30, and a top cover 40. The jellyroll 20 and the connecting sheet 30 are received in the housing 10, and the top cover 40 seals the housing 10. The jellyroll 20 is provided with a tab 21. The connecting sheet 30 includes a body part 31 and a side wing part 32. The cell 100 further includes a welding structure composed of the tab 21 and the side wing part 32. The welding structure is formed by welding. In addition, the top cover 40 is provided with an electrode column, and the electrode column is welded to the body part 31 of the connecting sheet 30 to form another welding structure.

Figure 3:
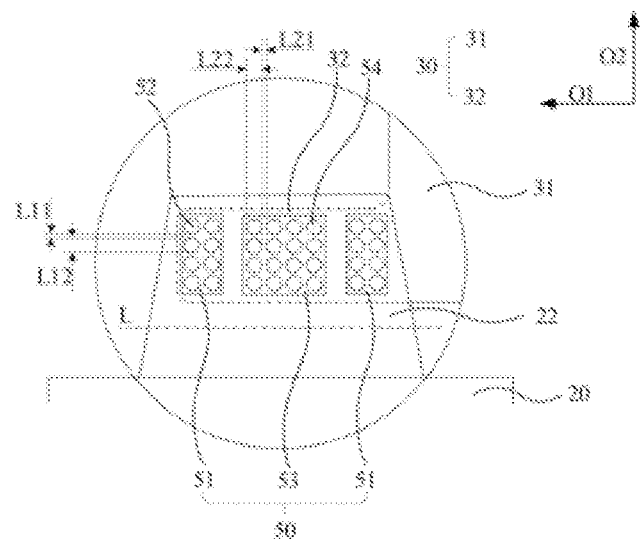
FIG. 3 is a top structural schematic view of a welding structure according to an exemplary embodiment.
Figure 4:
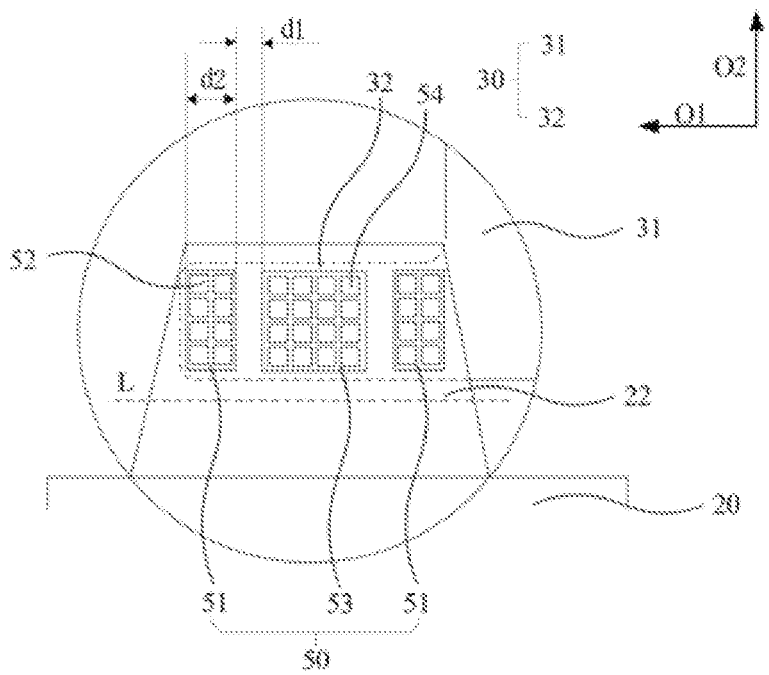
FIG. 4 is a top structural schematic view of another welding structure according to an exemplary embodiment.
Figure 5:
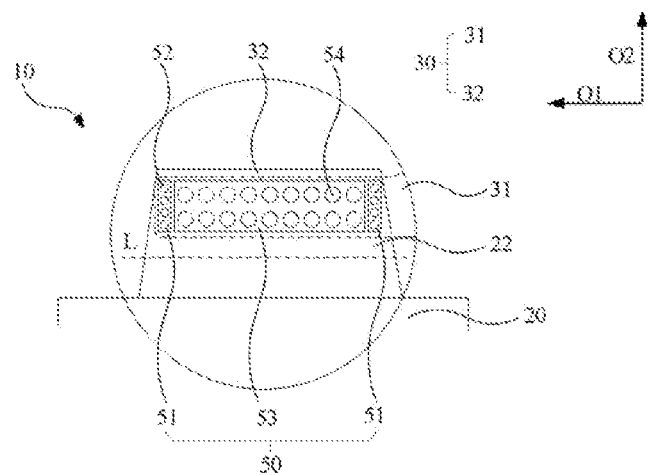
FIG. 5 is a top structural schematic view of yet another welding structure according to an exemplary embodiment.

The tab 21 provided on the jellyroll 20 is composed of stacked tab sheets. As shown in FIG. 3, 4, or 5, after the tab 21 is welded to a side of the connecting sheet 30, a welding area 50 is formed on one tab sheet (i.e., a first tab sheet 22) of the plurality of tab sheets farthest from the side wing part 32. That is, the welding structure formed by welding the tab 21 with the side wing part 32 of the connecting sheet 30 forms the welding area 50 on the first tab sheet 22.

In the embodiment of the present disclosure, the welding area 50 is directly formed on the first tab sheet 22. That is, when the tab 21 is welded with the connecting sheet 30, it is not necessary to provide the protective sheet, thereby reducing the cost and preventing the protective sheet from scratching the tab 21, which may cause the cell to be scrapped when the protective sheet is placed. In addition, a procedure of placing the protective sheet is omitted to simplify the welding process of the tab 21 and the connecting sheet 30, and greatly improve the welding efficiency of the tab 21 and the connecting sheet 30.

As shown in FIG. 1, the cell 100 includes two connecting sheets 30 (a positive connecting sheet and a negative connecting sheet) received within the housing 10. An end of the jellyroll 20 is provided with two tabs 21 (a positive tab and a negative tab) (not shown). The top cover 40 is provided with two electrode columns (a positive column and a negative column). The side wing part 32 of the positive connecting sheet is welded to the positive tab, and the body part 31 of the positive connecting sheet is connected with the positive column. The side wing part 32 of the negative connecting sheet is welded to the negative tab, and the body part 31 of the negative connecting sheet is connected with the negative column.

Optionally, as shown in FIGS. 1 and 2, the cell 100 includes two jellyrolls 20 received within the housing 10. At this time, the connecting sheet 30 includes two side wing parts 32, and the tabs 21 of the two jellyrolls 20 having the same polarity are respectively welded to the two side wing parts 32 of the connecting sheet 30.

Optionally, an end surface of the jellyroll 20 faces towards the top cover 40, and the end facing towards the top cover 40 is provided with two tabs 21. Alternatively, a centerline of the end surface of the jellyroll 20 is parallel to a plane where the top cover 40 is located, and each of the two ends of the jellyroll 20 is provided with one tab 21.

Optionally, for the welding structure formed by welding the tab 21 and the side wing part 32 of the connecting sheet 30, a thickness of the welding structure is H, wherein 1.8 mm≤H≤2.2 mm. In this way, the thickness of the welding structure is defined, avoiding the risk that the connecting sheet 30 and the tab 21 may be easily tore due to a thin welding structure, thereby ensuring the stability of connection between the tab 21 and the connecting sheet 30 and the flow guiding effect. A situation where a thick welding structure occupies a larger space inside the housing 10 is avoided, so that the overall volume of the energy storage device is large.

The thickness of the welding structure refers to a thickness of the side wing part 32 of the connecting sheet 30 in the welding area 50, and a total thickness of the plurality of tab sheets. In this way, the thickness of the welding structure can be adjusted by changing the number of layers of the tab sheets and the thickness of the side wing part 32, so that the thickness H of the welding structure satisfies a relationship of 1.8 mm≤H≤2.2 mm.

Optionally, when the tab 21 and the side wing part 32 of the connecting sheet 30 are welded, a plurality of welding spots are formed in the welding area 50 on the first tab sheet 22, and a depth of the welding spot is S, i.e., 1 mm≤S≤1.5 mm. In this way, a maximum depth of the welding spot is defined to reduce the deformation area of the tab 21, that is, reduce the deformation amount of the tab 21, thereby reducing the risk of tearing of the tab 21. Meanwhile, a minimum depth of the welding spot is defined, ensuring the welding stability between the tab 21 and the side wing part 32 of the connecting sheet 30, and avoiding the risk that the tab 21 falls off the side wing part 32.

The plurality of welding spots within the welding area 50 may be distributed in an arbitrary manner, such as in an array of m×n, where m and n both are integers greater than or equal to 1, m is the number of welding spots in a length direction O1 of the side wing part 32, and n is the number of welding spots in a width direction O2 of the side wing part 32.

Optionally, the welding spot within the welding area 50 may be circular, rectangular, or rhombic, etc. For example, the welding spot is circular, the welding spot is square, or the welding spot is rhombic. Of course, the welding spot may also be elliptical, parallelogram, etc., depending on a shape of a welding head of an ultrasonic welding machine. The shapes of the welding spots according to the present disclosure are cross-sectional shapes of the welding spots respectively, that is, projection shapes of the welding spots in a thickness direction of the connecting sheet 30.

Optionally, welding mark areas of the welding spots within the welding area 50 may be the same or different. For example, each of the plurality of welding spots within the welding area 50 is circular with a diameter of 2 mm; or each of the welding spots is square with a side length of 2 mm; or each of the welding spots is rhombic with a side length of 3.5 mm.

Optionally, a distance between two adjacent welding spots within the welding area 50 is less than or equal to a size of the welding spot in a layout direction of the two adjacent welding spots. In this way, a distribution density of the welding spots within the welding area 50 is adjusted to ensure the stability of the welding between the tab 21 and the connecting sheet 30, while reducing the risk of tearing of the tab 21.

For example, when a circular welding spot with a diameter of 2 mm, the distance between two adjacent welding spots within the welding area 50 is less than 1 mm. When a square welding spot with a side length of 2 mm is taken as an example, the distance between two adjacent welding spots within the welding area 50 is less than 1 mm.

In some embodiments, as shown in FIG. 2, an area of the welding area 50 is S1, an area of the side wing part 32 is S2, and a projection area of the first tab sheet 22 on a plane where the side wing part 32 is located is S3, wherein $0.4 \leq S1/S2 \leq 0.8$; and $0.14 \leq S1/S3 \leq 0.28$.

In the embodiment of the present disclosure, it is not necessary to provide the protective sheet. After the side wing part of the connecting sheet is attached to the tab, selecting an appropriate area proportion of the welding area can greatly reduce the generation of debris while ensuring the welding strength, thereby reducing the safety hazards of the energy storage device. In addition, selecting the appropriate area proportion of the welding area can also ensure the flow guiding effect between the tab and the side wing part of the connecting sheet, thereby ensuring the electrical performance of the energy storage device.

For the assembled cell 100, the first tab sheet 22 is usually in a bended state. That is, after the first tab sheet 22 is welded with the side wing part 32 of the connecting sheet 30, the first tab sheet 22 is bent along a bending line L as shown in FIG. 3, 4, or 5, so as to facilitate to seal the top cover 40 onto the housing 10. After the first tab sheet 22 is bent along the bending line L, the first tab sheet 22 includes a vertical part (which is directly connected to the jellyroll 20) perpendicular to a plane where the side wing part 32 is located, and a plane part (which is connected to the jellyroll 20 through the vertical part) parallel to the plane where the side wing part 32 is located. In this way, a projection area of the first tab sheet 22 on the plane where the side wing part 32 is located is an area of the plane part included in the first tab sheet 22.

In the embodiment of the present disclosure, the welding area 50 may be a continuous area or separated areas spaced apart from each other.

In some embodiments, as shown in FIG. 3, 4, or 5, the welding area 50 includes a fixing welding area 51 and a guiding welding area 53. The fixing welding area 51 and the guiding welding area 53 are distributed along the length direction O1 of the side wing part 32.

In this way, the fixing welding area 51 and the guiding welding area 53 are provided so that the tab 21 and the side wing part 32 may be welded by separate regions, so as to reduce welding areas of separated areas between the tab 21 and the side wing part 32. Thus, the deformation amount per unit length during the welding of the tab 21 in the length direction O1 of the side wing part 32 is reduced, and thereby reducing the risk of tearing of the tab 21. In addition, the fixing welding area 51 and the guiding welding area 53 are separated, increasing the overall welding area 50 between the tab 21 and the connecting sheet 30, improving the stability of connection between the tab 21 and the connecting sheet 30, and increasing the overall flow guiding area between the tab 21 and the connecting sheet 30.

An area of the fixing welding area 51 is smaller than an area of the guiding welding area 53, so that a small area welding is provided in the fixing welding area 51 to achieve pre-fixation of the tab 21 and the connecting sheet 30. Then, a large area welding is provided in the guiding welding area 53 to ensure the flow guiding effect between the tab 21 and the connecting sheet 30, thereby reducing the risk of tearing of the tab 21 during welding.

For the welding of the tab 21 with the side wing part 32 of the connecting sheet 30, as shown in FIG. 3, 4, or 5, several first welding spots 52 located in the fixing welding area 51 and several second welding spots 54 located in the guiding welding area 53 may be formed.

The number of the first welding spots 52 and the number of the second welding spots 54 may be same or different. When the number of the first welding spots 52 is same as the number of the second welding spots 54, a welding mark area of the first welding spots 52 is smaller than a welding mark area of the second welding spots 54, so as to ensure that the area of the fixing welding area 51 is smaller than the area of the guiding welding area 53.

For example, the number of first welding spots 52 is different from the number of second welding spots 54. As shown in FIG. 3 or 4, the fixing welding area 51 includes eight first welding spots 52 distributed in an array of 2×4, and the guiding welding area 53 includes sixteen second welding spots 54 distributed in an array of 4×4. Alternatively, as shown in FIG. 5, the fixing welding area 51 includes four first welding spots 52 distributed in an array of 1×4, and the guiding welding area 53 includes eighteen second welding spots 54 distributed in an array of 9×2.

The shape and distribution of the first welding spots 52 and the second welding spots 54 may refer to the shape and distribution of the welding spots as mentioned above, not limited in the embodiment of the present disclosure. The shape of the first welding spot 52 and the shape of the second welding spot 54 may be the same or different.

For example, the shape of the first welding spot 52 is same as that of the second welding spot 54. As shown in FIG. 3 or 5, the first welding spot 52 and the second welding spot 54 are both circular. Alternatively, as shown in FIG. 4, the first welding spot 52 and the second welding spot 54 are both square, or the first welding spot 52 and the second welding spot 54 are both rhombic.

The welding mark area of the first welding spot 52 and the second welding spot 54 may be equal or not equal. When the welding mark area of the first welding spot 52 and the welding mark area of the second welding spot 54 are equal, the number of the first welding spots 52 is less than the number of the second welding spots 54 to ensure that the area of the fixing welding area 51 is smaller than the area of the guiding welding area 53. When the welding mark area of the first welding spots 52 is smaller than that of the second welding spots 54, the size of the first welding spot 52 is reduced when welding in the fixing welding area 51, thereby reducing the deformation amount of the tab 21 during welding, and reducing the risk of tearing of the tab 21 during welding in the fixing welding area 51. Meanwhile, the size of the second welding spot 54 is increased when welding in the guiding welding area 53 to ensure that the tab 21 and the side wing part 32 have sufficient contact area in the guiding welding area 53, thereby ensuring the flow guiding effect between the tab 21 and the connecting sheet 30.

For example, the welding mark area of the first welding spot 52 is equal to the welding mark area of the second welding spot 54. As shown in FIG. 3, the first welding spot 52 and the second welding spot 54 are both circular with a diameter of 2 mm. Alternatively, as shown in FIG. 4, the first welding spot 52 and the second welding spot 54 are both square with a side length of 2 mm. For another example, the welding mark area of the first welding spot 52 is different from the welding mark area of the second welding spot 54, as shown in FIG. 5, the first welding spot 52 is circular with a diameter of 1 mm, while the second welding spot 54 is circular with a diameter of 2 mm. The welding mark area according to the present disclosure is a cross-sectional area of the welding spot, that is, a projection area of the welding spot in the thickness direction of the connecting sheet.

In some embodiments, as shown in FIG. 3, for the first welding spots 52 within the fixing welding area 51, a distance between adjacent first welding spots 52 is L11, and a size of the first welding spot 52 in a layout direction of the adjacent first welding spots 52 is L12, wherein L11<L12. In this way, the density of the first welding spots 52 in the fixing welding area 51 is adjusted in the length direction O1 and the width direction O2 of the side wing part 32, thereby ensuring the welding stability between the tab 21 and the connecting sheet 30.

Furthermore, as shown in FIG. 3, the distance between the two adjacent first welding spots 52 is L11, and the size of the first welding spot 52 in the layout direction of the two adjacent first welding spots 52 is L12, wherein L11/L12>10%. In this way, a minimum distance between the two adjacent first welding spots 52 in the fixing welding area 51 is defined in the length direction O1 and the width direction O2 of the side wing part 32, thereby avoiding a situation where the two adjacent first welding spots 52 are too close to cause a large deformation amount of the tab 21 within a unit size. Thus, the risk of tearing of the tab 21 is reduced.

In some embodiments, as shown in FIG. 3, for the second welding spots 54 in the guiding welding area 53, a distance between the adjacent two second welding spots 54 is L21, and a size of the second welding spot 54 in a layout direction of the adjacent two second welding spots 54 is L22, wherein L21<L22. In this way, the density of the second welding spots 54 in the guiding welding area 53 is adjusted in the length direction O1 and the width direction O2 of the side wing part 32, thereby ensuring the flowing effect between the tab 21 and the connecting sheet 30.

Furthermore, as shown in FIG. 3, the distance between the two adjacent second welding spots 54 is L21, and the size of the second welding spot 54 in the layout direction of the two adjacent second welding spots 54 is L22, wherein L21/L22>10%. In this way, a minimum distance between two adjacent second welding spots 54 in the guiding welding area 53 is defined in the length direction O1 and width direction O2 of the side wing part 32, thereby avoiding a situation where the adjacent second welding spots 54 are too close to cause a large deformation amount of the tab 21 within a unit size. Thus, the risk of tearing of the tab 21 is reduced.

In some embodiments, as shown in FIG. 3, 4, or 5, the plurality of welding areas 50 include two fixing welding areas 51. The two fixing welding areas 51 are located on both sides of the guiding welding area 53 along the length direction O1 of the side wing part 32. In this way, the two fixing welding areas 51 are fixedly welded at both ends of the side wing part 32 in the length direction O1, thereby further ensuring the stability of the relative position between the tab 21 and the connecting sheet 30 before the flow guiding welding. In addition, the welding area 50 is further divided into three partition areas, further increasing a distribution range of the three partition areas, thereby increasing the overall fixing area between the tab 21 and the connecting sheet 30. Thus, the stability of the connection between the tab 21 and the connecting sheet 30 is improved, and the overall flow guiding of the tab 21 and the connecting sheet 30 is increased.

Optionally, two fixing welding areas 51 are symmetrically distributed with respect to the guiding welding area 53, that is, distances between the two fixing welding areas 51 and the guiding welding area 53 are equal. In this way, the overall uniformity of the flow guiding in the flow guiding area between the tab 21 and the connecting sheet 30 can be ensured, thereby ensuring the flow guiding effect between the tab 21 and the connecting sheet 30.

In some embodiments, as shown in FIG. 4, a distance between the fixing welding area 51 and the guiding welding area 53 is d1, and a size of the fixing welding area 51 in the length direction of the side wing part 32 is d2, wherein d1/d2≤1.5. In this way, when welding the tab 21 and the connecting sheet 30, a gap between the fixing welding area 51 and the guiding welding area 53 is defined. Thus, the deformation of the tab 21 in the fixing welding area 51 and the guiding welding area 53 can be alleviated through the gap, so as to reduce the deformation amount of the tab 21 per unit length in the length direction O1 of the side wing part 32, thereby further reducing the risk of tearing of the tab 21 during welding.

Optionally, combined with the above-mentioned that the fixing welding area 51 includes the first welding spot 52, the guiding welding area 53 includes the second welding spot 54, the gap between the fixing welding area 51 and the guiding welding area 53 is less than the size of the first welding spot 52 or the second welding spot 54 in the length direction O1 of the side wing part 32. In this way, the distance between the fixing welding area 51 and the guiding welding area 53 is shortened to increase the welding area between the tab 21 and the connecting sheet 30, thereby further ensuring the welding strength and ensuring the flow guiding effect between the tab 21 and the connecting sheet 30.

In the embodiment of the present disclosure, there is an overlapping area between the side wing part 32 and the first tab sheet 22 in the thickness direction of the side wing part 32. In this way, when welding the tab 21 and the connecting sheet 30, the welding area 50 on the first tab sheet 22 is located within the overlapping area between the side wing part 32 and the first tab sheet 22. Combined with the above mentioned that the welding area 50 includes the fixing welding area 51 and the guiding welding area 53 as described above, as shown in FIG. 3, 4, or 5, both the fixing welding area 51 and the guiding welding area 53 are located in the overlapping area between the side wing part 32 and the first tab sheet 22.

Figure 6:
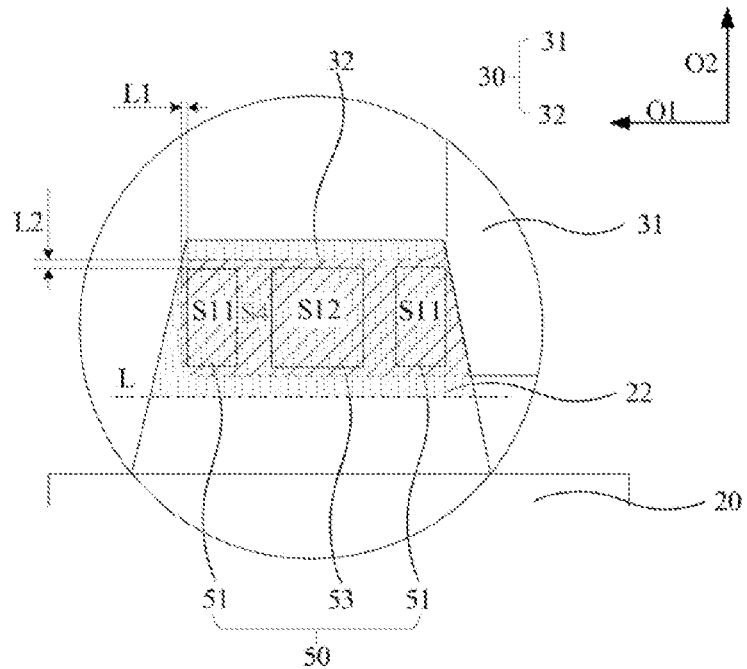
FIG. 6 is a top structural schematic view of still another welding structure according to an exemplary embodiment.

In some embodiments, for the fixing welding area 51, as shown in FIG. 6, an area of the fixing welding area 51 is S11, and an area of the overlapping area is S4, wherein 5%≤S11/S4≤25%. In this way, the area of the fixing welding area 51 is defined, ensuring the stability of the welding between the tab 21 and the connecting sheet 30 during the fixing welding process, and also avoiding the large deformation of the tab 21 per unit area caused by the large area of the fixing welding area 51, thereby avoiding the tearing of the tab 21.

In addition, as shown in FIG. 6, taking the length direction along the side wing part 32 as an example, a distance between an edge of the fixing welding area 51 and an edge of the overlapping area is L1, wherein 1 mm≤L1≤3 mm. Alternatively, a distance between an edge of the fixing welding area 51 and an edge of the overlapping area along the width direction of the side wing part 32 may be L1; or the distance between the edge of the fixing welding area 51 and the edge of the overlapping area along the length direction or the width direction of the side wing part 32 is L1. In this way, the edges of the fixing welding area 51 and the side wing part 32 are defined, so as to increase the fixing area between the tab 21 and the connecting sheet 30 in the side wing part 32 along the length direction O1 and the width direction O2, and increase the welding size of the tab 21 and the connecting sheet 30 in the length direction O1 and the width direction O2 of the side wing part 32, thereby effectively reducing the risk of tearing of the tab 21, that is, ensuring the stability of the welding between the tab 21 and the connecting sheet 30 while effectively reducing the risk of tearing of the tab 21. For example, in the width direction O2 of the side wing part 32, the distance between the edge of the fixing welding area 51 and the edge of the overlapping area is 1 mm; and in the length direction O1 of the side wing part 32, the distance between the edge of the fixing welding area 51 and the edge of the overlapping area is 1.5 mm.

In some embodiments, for the guiding welding area 53, as shown in FIG. 6, an area of the guiding welding area 53 is S12, and the area of the overlapping area is S4, wherein 10%≤S12/S4≤90%. In this way, the area of the guiding welding area 53 is defined to ensure sufficient contact area between the tab 21 and the connecting sheet 30 during the flow guiding welding, thereby ensuring the flow guiding effect between the tab 21 and the connecting sheet 30, and further improving the stability of the welding of the tab 21 and the connecting sheet 30.

In addition, as shown in FIG. 6, along the width direction of the side wing part 32, the distance between the edge of the guiding welding area 53 and the edge of the overlapping area is L2, wherein 1 mm≤L2≤3 mm. In this way, the edges between the guiding welding area 53 and the side wing part 32 are defined to increase the welding size between the tab 21 and the connecting sheet 30 in the width direction O2 of the side wing part 32, thereby effectively reducing the risk of tearing of the tab 21. For example, in the width direction O2 of the side wing part 32, the distance between the edge of the guiding welding area 53 and the edge of the overlapping area is 1 mm.

The embodiment of the present disclosure further provides an electrical equipment, which may be a vehicle, an energy storage container, etc. The electrical equipment includes the energy storage device as described in the above embodiments, which is used to supply power to the electrical equipment. In this way, in combination with the aforementioned energy storage device, the safety hazards of the energy storage device can be reduced, while the safety of using the electrical equipment is improved. When it is not necessary to provide the protective sheet, it is beneficial to reduce the weight of the energy storage device, thereby reducing the load on the electrical equipment and improving its performance.

In the embodiment of the present disclosure, the terms "first", "second", and "third" are only used for descriptive purposes and cannot be understood as indicating or implying relative importance; the term "plurality" refers to two or more, unless otherwise specified. The terms "install", "interconnect", "connect", "fix" and other terms should be understood in a broad sense. For example, "connect" may refer to a fixed connection, a detachable connection, or an integrated connection; "interconnect" may refer to direct interconnection or indirectly interconnection through an intermediate medium. For those skilled in the art, the specific meanings of the above terms in the embodiments of the present disclosure can be understood based on specific circumstances.

In the description of the embodiments of the present disclosure, it should be understood that the terms "above", "under", "left", "right", "front", "back" and the like indicate the orientation or positional relationship based on the orientation or positional relationship shown in the attached drawings, only for the convenience of describing the embodiments and simplifying the description, rather than indicating or implying that the device or unit referred to must have a specific direction, be constructed and operated in a specific orientation. Therefore, It cannot be understood as a limitation on the embodiments.

In the description of the specification, the terms "one embodiment", "some embodiments", "specific embodiments", etc. refer to the specific features, structures, materials, or features described in conjunction with the embodiment or example being included in at least one embodiment or example of the embodiment. In the specification, the schematic expressions of the above terms do not necessarily refer to the same embodiments or examples. Moreover, the specific features, structures, materials, or features described can be combined in an appropriate manner in any one or more embodiments or examples.

The above are only preferred embodiments of the present disclosure and are not intended to limit the application. For those skilled in the art, the embodiments may have various changes and variations. Any modifications, equivalents, improvements, etc. made within the spirit and principles of the embodiment shall be included within the scope of claims of the application.

What is claimed is:

1. An energy storage device, comprising a housing, a jellyroll, a connecting sheet, and a top cover, wherein the jellyroll and the connecting sheet are received within the housing, and the top cover seals the housing,
   the jellyroll is provided with a tab, and the connecting sheet includes a body part and a side wing part;
   the energy storage device further comprises a welding structure, which is composed of the tab and the side wing part, and is formed by welding;
   the tab comprises a plurality of tab sheets, in which a tab sheet farthest from the side wing part is a first tab sheet, the welding structure forms a welding area on the first tab sheet;
   an area of the welding area is S1, an area of the side wing part is S2, and a projection area of the first tab sheet on a plane where the side wing part is located is S3, wherein 0.4≤S1/S2≤0.8, 0.14≤S1/S3≤0.28;
   in a thickness direction of the side wing part, there is an overlapping area between the side wing part and the first tab sheet, the welding area comprises two fixing welding areas and a guiding welding area located in the overlapping area, and the fixing welding area and the guiding welding area are distributed along a length direction of the side wing part;

an area of each of the two fixing welding areas is S11, an area of the guiding welding area is S12, and an area of the overlapping area is S4, wherein 5%≤S11/S4≤25%, 10%≤S12/S4≤90%, and S11<S12, wherein the two fixing welding areas are located on both sides of the guiding welding area along the length direction of the side wing part.

2. The energy storage device according to claim 1, wherein a distance between the fixing welding area and the guiding welding area is d1, and a size of the fixing welding area in the length direction of the side wing part is d2, wherein d1/d2≤1.5.

3. The energy storage device according to claim 2, wherein the side wing part is welded with the tab to form several first welding spots located in the fixing welding area, and several second welding spots located in the guiding welding area;

a gap between the fixing welding area and the guiding welding area is less than a size of the first welding spot or the second welding spot in the length direction of the side wing part.

4. The energy storage device according to claim 3, wherein a welding mark area of the first welding spots is smaller than a welding mark area of the second welding spots.

5. The energy storage device according to claim 1, wherein a distance between an edge of the fixing welding area and an edge of the overlapping area is L1, 1 mm≤L1≤3 mm.

6. The energy storage device according to claim 1, wherein a distance between an edge of the guiding welding area and an edge of the overlapping area is L2, 1 mm≤L2≤3 mm.

7. The energy storage device according to claim 1, wherein the plurality of tab sheets are welded with the side wing part to form several first welding spots, and the first welding spots are located in the fixing welding area;

a distance between two adjacent first welding spots is L11, and a size of the first welding spot in a layout direction of the two adjacent first welding spots is L12, L11<L12.

8. The energy storage device according to claim 7, wherein 100%>L11/L12>10%.

9. The energy storage device according to claim 1, wherein the plurality of tab sheets are welded with the side wing part to form several second welding spots, and the second welding spots are located in the guiding welding area;

a distance between two adjacent second welding spots is L21, and a size of the second welding spot in a layout direction of the adjacent two second welding spots is L22, L21<L22.

10. The energy storage device according to claim 9, wherein 100%>L21/L22>10%.

11. The energy storage device according to claim 1, wherein the two fixing welding areas are symmetrically distributed with respect to the guiding welding area.

12. The energy storage device according to claim 1, wherein a thickness of the welding structure is greater than or equal to 1.8 mm and less than or equal to 2.2 mm.

13. The energy storage device according to claim 12, wherein the welding area includes a plurality of welding spots, and a depth of the welding spot is greater than or equal to 1 mm and less than or equal to 1.5 mm.

14. An electrical equipment, wherein the electrical equipment comprises an energy storage device according to claim 1, and the energy storage device supplies power to the electrical equipment.

* * * * *